United States Patent [19]
Karppinen

[11] Patent Number: 5,920,619
[45] Date of Patent: Jul. 6, 1999

[54] REGIONAL CENTREX

[75] Inventor: Ilkka Karppinen, Oulu, Finland

[73] Assignee: Nokia Telecommunications Oy, Espoo, Finland

[21] Appl. No.: 08/817,658

[22] PCT Filed: Oct. 5, 1995

[86] PCT No.: PCT/FI95/00550

§ 371 Date: Jun. 20, 1997

§ 102(e) Date: Jun. 20, 1997

[87] PCT Pub. No.: WO96/11544

PCT Pub. Date: Apr. 18, 1996

[30] Foreign Application Priority Data

Oct. 5, 1994 [FI] Finland ..................................... 944665

[51] Int. Cl.⁶ ............................. H04M 3/42; H04M 7/00
[52] U.S. Cl. .......................... 379/207; 379/220; 379/229; 379/901
[58] Field of Search .................................... 379/207, 211, 379/212, 216, 219, 220, 225, 229, 230, 901

[56] References Cited

U.S. PATENT DOCUMENTS

| 4,802,199 | 1/1989 | Lange et al. ............................. 379/221 |
| 5,247,571 | 9/1993 | Kay et al. ........................... 379/207 X |
| 5,539,817 | 7/1996 | Wilkes ................................... 379/230 |

*Primary Examiner*—Harry S. Hong
*Attorney, Agent, or Firm*—Pillsbury Madison & Sutro LLP

[57] ABSTRACT

In a regional telephone network system offering centrex services, a closed user group is distributed as subgroups to several different telephone exchanges. According to the invention, the management of user groups can be implemented in such a way that a table-type subscriber database is stored in each exchange with subscribers of at least one closed user group. The database is associated with this user group and contains all information necessary for implementing centrex services so that when the call control of the exchange detects on the basis of the subscriber data that the subscriber belongs to the closed user group, it utilizes the subscriber database when establishing a call.

15 Claims, 4 Drawing Sheets

REGIONAL CENTREX

This application is the national phase of international application PCT/FI95/00550 filed Oct. 5, 1995 which designated the U.S.

FIELD OF THE INVENTION

The present invention relates to a system for managing a closed user group which is distributed under the control of a plurality of exchanges. The system allows centrex service to be offered to subscribers belonging to the same group but located geographically over a wide area.

BACKGROUND OF THE INVENTION

The centrex service is a service offered by a teleoperator in addition to basic services. In the centrex service, a certain number of subscriber connections of an exchange are allocated to one organization, e.g., a company. The centrex service, which is associated with a telephone exchange and managed by an operator, offers the same services as a PBX or PABX exchange of a company, wherefore it is not necessary for so that a company need not purchase and maintain an exchange of its own. originally, only subscribers belonging to the same exchange could be included in the centrex service. The service thus allowed internal calls and call transfer from a subscriber line via an exchange only to another subscriber line connected to the same exchange. In the expanded service developed later, subscribers located geographically far from each other, and thus, subscribers connected to different exchanges, belonged to the same centrex group. This was possible only if the user of the service leased a private line which connected the different exchanges to each other. This is, however, expensive, and changes in the routing of a call require switching operations performed by the operator in the exchanges, which is cumbersome and costly.

The problem becomes more serious when a company has offices in many places over a geographically wide area, and the offices should be combined into one centrex group, whereby it is possible to make internal calls and call transfers through many exchanges.

A solution to this problem with regional centrex service is disclosed in PCT application WO 93/17515. It discloses a service whose architecture is adapted to an advanced intelligent network (AIN). In a network of this kind, an exchange is connected to one or more corresponding exchanges by trunk lines, and each exchange has a data link using common channel signaling to a signaling transfer point STP, which in turn is connected to an integrated service control point (ISPC).

The above system will be described in greater detail with reference to FIG. 1. Exchanges 11, 13, 15, 17, which are each indicated by SSP (Service Switching Point), are programmable exchanges. The exchanges identify AIN-type calls, send interrogations to ISCQ, and receive instructions and data therefrom for call processing. Exchanges 11, 13 are connected via data links to a regional signaling transfer point 23 (STP), and exchanges 15 and 17 are connected to another regional signaling transfer point. The exchanges are connected to each other by trunk lines, which transfer calls. Regional STP nodes 23 and 24 are connected to a regional STP node 31, which in turn is connected to a service control point ISCP 40. The connections from the exchanges to nodes 23 and 25 are data links, e.g., common channel signaling links according to CCITT #7, whereas the connections from the nodes to the STP node and from the STP node to the service point are packet network links. ISCP 40 comprises a service management system 41, a data and reporting system 45, and a service control point 43.

The regional centrex solution of the present invention is based on the idea that a centralized database is provided in the service point ISCP 40. This database contains all data relevant to the centrex service. The regional exchanges SSP 11, ..., 17 are programmed to identify as regional centrex calls, the call and service requests from certain subscriber lines coupled to the service and connected to the exchange. When an exchange, e.g. exchange 11, receives a service request from such a subscriber line, e.g., terminal A, the exchange, first, detects that the line is a centrex line. Then, the exchange 11 sends a request on the signaling channel SS #7 through the signaling transfer points 23, 31 to the service control point ICP 40 for all information necessary to process the call. The request contains both the subnumber of the calling subscriber and the digits dialled by the subscriber. The control point 40 fetches the data of the calling subscriber from the database, and based on this data and the digits dialed gives the exchange 11 instructions for routing the call. The task may be, for example, a call or a call transfer to a subscriber D belonging to the same centrex group and connected to an exchange 17 which is geographically remotely situated.

In the convention system, centrex services are provided and changed, with regard to one subscriber line, in a centralized manner in this one service control point ISCP. The advantage of this system is that the centralization does not entail programming changes in exchanges controlled by it. The drawback of this system is, however, that its operational environment must always be an intelligent network (IN), which employs advanced signaling between specific signaling nodes SSP, STP, ICP, i.e., the system requires advanced signaling between the IN database center and the exchanges of both the calling and the called subscriber. The system is thus difficult to adapt to current telephone phone network systems, which have long been in use.

The object of the present invention is a regional centrex system which does not have the drawbacks of the known system and which is particularly suitable for use in current networks without being limited by possibly different signaling between the exchanges. The members of a closed user group must be able to establish speech connections using internal numbers of the group, i.e., subnumbers, which should be independent of the actual directory numbers of the subscribers. It must be possible to include subscribers from different exchanges and different local networks to a closed user group. It must be possible to identify subscribers belonging to the same closed user group and to offer them a number of different facilities. Addition of new numbers and removal of numbers, i.e., maintenance of the system, must be simple. Another object is to provide a system in which the operator can serve a plurality of centrex groups using the subnumbers of these groups.

These objects will be achieved with a telephone network system that offers centrex services and a method of offering a network system having centrex services.

SUMMARY OF THE INVENTION

According to the invention, closed centrex user groups are formed by providing a table-type database in each exchange with at least one centrex subscriber. Each user group has its own table. In order to allow call control to address interrogations regarding a subnumber-to-directory number conversion and "does the calling subscriber belong to the user group of the called subscriber" to the correct table, the subscriber data of each subscriber belonging to the user group are provided in the table with addressing to the data of the user group.

The directory numbers, including area codes, are stored in the table so that subscribers in different local networks can belong to the same closed user group.

Data on the length of the subnumber is stored in the table so that the call control knows to expect a certain number of dialed digits before executing the subnumber-to-directory number conversion, whereby unnecessary interrogations to the database are avoided.

Charging data needed for calls are stored in the user group data in the table so that the call control can route calls in accordance with the route selection analysis path used by normal calls. Normal subscribers refer to subscribers not belonging to a closed user group. The maintenance of overlapping analysis trees is thus avoided.

In the user group data in the table there is also stored a number of an outgoing call, based on which the call control detects that a subscriber of a closed user group tries to make an external call from the closed user group using normal directory numbers.

All necessary number conversions relating to a user group and verifications as to whether the calling subscriber belongs to the user group can thus be performed by the same table. A subscriber can then be identified as soon as the directory number of the calling subscriber is signaled to the exchange of the called subscriber. In the system of the invention, each user group is addressed by the operators of the exchange merely by the name of the group. One user group has the same name in all exchanges. The data of this group can thus be updated without referring to the actual location of the table in the exchange.

The numbers of the table are preferably utilized for implementing an operator place according to the regional centrex concept. The operator place serving several centrex groups. The operator can establish speech connections using subnumbers of more than one closed user group. The subscriber does not have to use any procedure, such as */i characters or a certain separate number sequence, to indicate the subnumber group being used. This is possible if the number(s) reserved to identify the user group is/are given as the first number(s) in the subnumbers of a closed user group. All subnumbers of a user group thus begin with the same number sequence, and each group has its own individual sequence. This allows the operator to place a call by using merely the subnumber, and the call control routes the connection to the correct subnumber of the centrex user group based on the numbers reserved for identification.

BRIEF DESCRIPTION OF THE DRAWINGS

In the following, the invention will be described in greater detail by means of a preferred embodiment with reference to the accompanying drawings, in which.

DETAILED DESCRIPTION OF THE INVENTION

Figure 1:
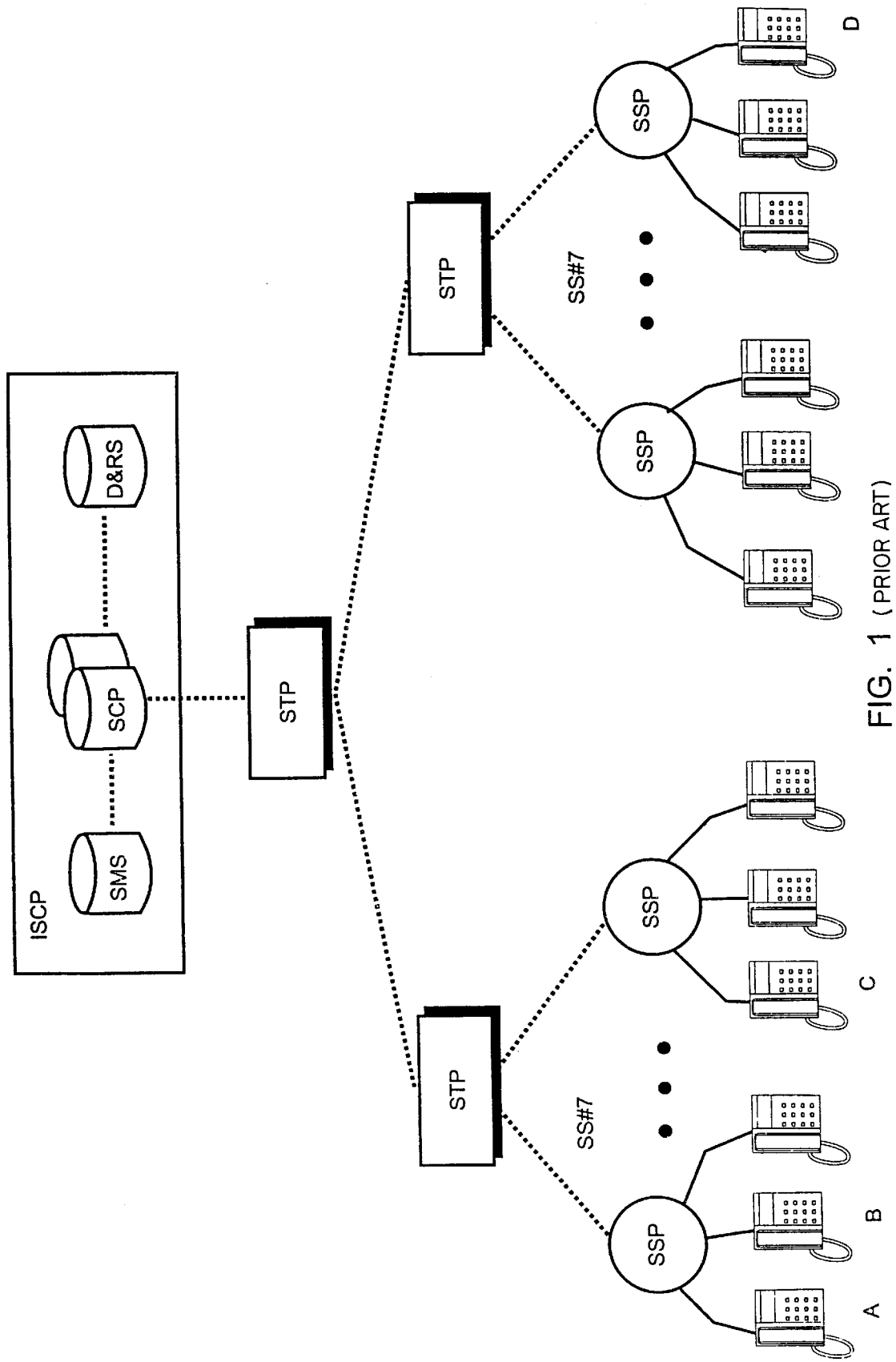
FIG. 1 shows a known regional centrex system.
Figure 2:
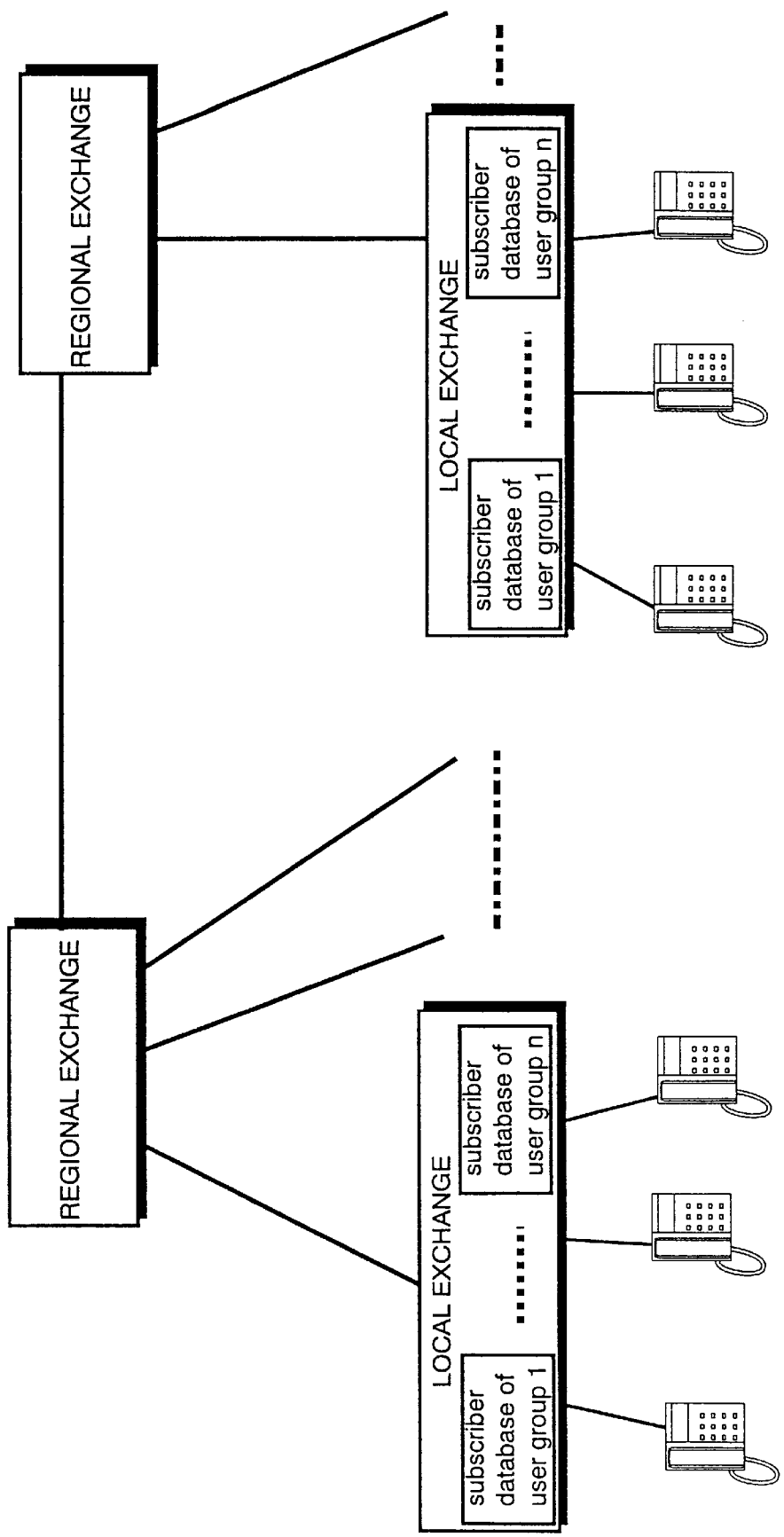
FIG. 2 shows a telephone network provided with regional centrex.

FIG. 2 shows a specific table-type centrex file, which is a subscriber database, that is created in each exchange with centrex subscribers. The telephone network may be any modern network, and it does not have to be an IN network. The exchange may be of any known type comprising a software block which offers basic switching services and in which a program block reading the centrex file can advantageously be provided.

Figure 3:
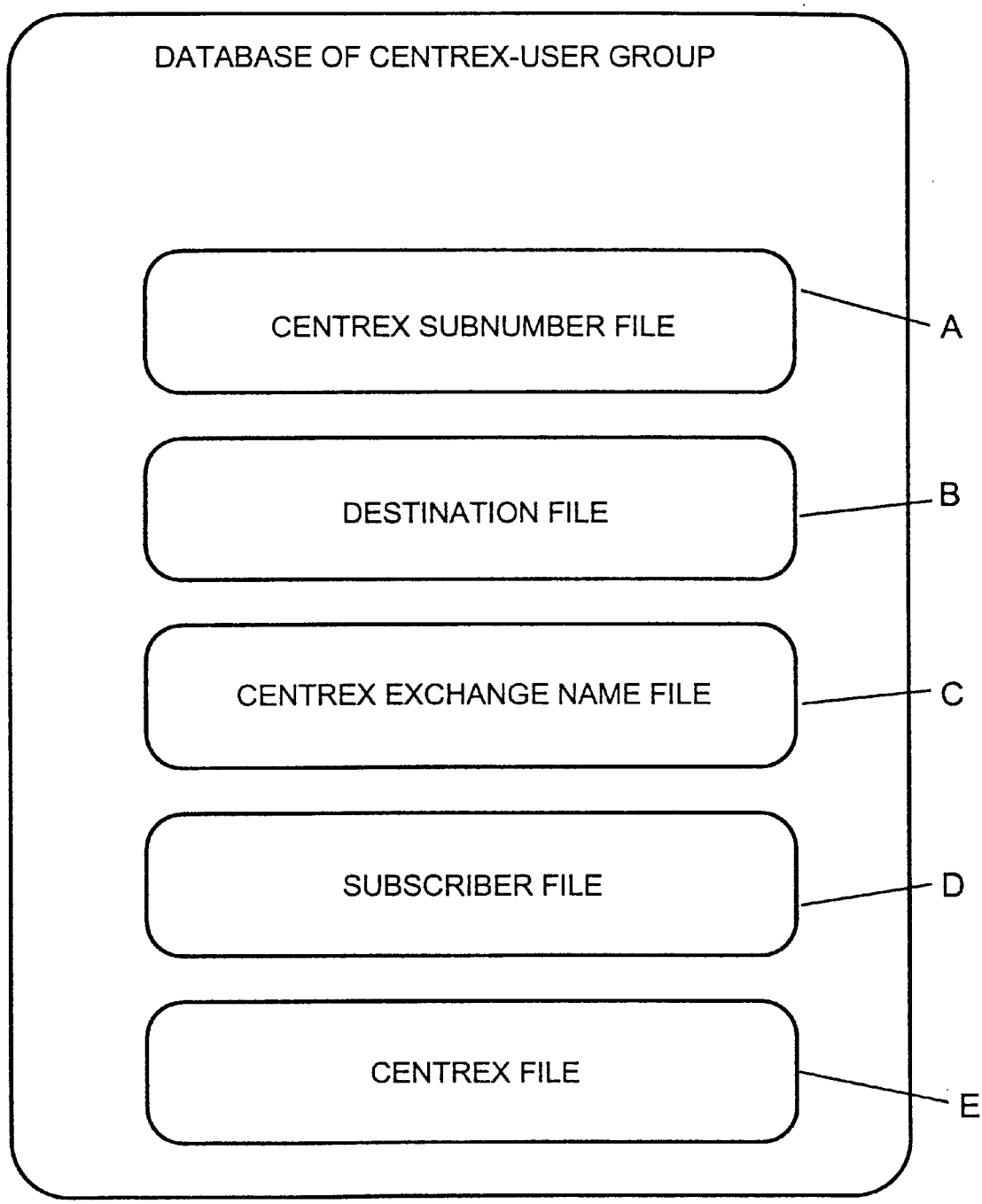
FIG. 3 shows different files of a database.

FIG. 3 shows a database that includes at least five files: A) centrex group data file, B) centrex group subnumber file, C) centrex exchange name file, D) subscriber file, and E) destination file.

The file 'Centrex' of item A contains the following information: 1) name of centrex group, 2) call number of centrex group, 3) area code of call number, 4) charging method within subgroup, 5) charging method between subgroups, 6) main charging zone for calls within subgroup, 7) additional charging zone for calls within subgroup, 8) main charging zone for calls between subgroups, 9) additional charging zone for calls between subgroups, 10) first digits of subnumber, 11) length of subnumber, 12) out-line number, 13) operator identifier, 14) operator number, 15) call return number, 16) numbers of operator place, 17) length of abbreviated number, 18) starting digit of abbreviated number, and 19) centrex type information.

The file 'Centrex Subnumber' of item B is a subnumber file where a subnumber is converted to a directory number and vice versa. The charging subgroup of a member is also obtained from this information. The file thus comprises 1) subnumber, 2) index of centrex group file, 3) directory number, 4) area code of directory number, 5) number of charging subgroup, and 6) subscriber status data, i.e., and information on whether the subscriber is a subscriber of said exchange.

The file for the names of centrex exchanges, 'Centrex Exchange Name', according to item C defines the names of those exchanges to which the centrex is distributed. The file thus contains a list of the names of exchanges.

The file of item D contains the information indicated by the facility group of a centrex member, and the file 'Destination' of item E contains the centrex service number and the service number.

The files of the databases located in the exchanges are changed, created, and updated by operation and maintenance commands. The operation and maintenance commands are given from an operation and maintenance center, which is a known part of a modern telephone network. From there, these commands are sent via the operations and maintenance network to each exchange. By an operation and maintenance command, it is possible to create a new centrex group, in which case at least items 1 to 11 and 19 of the above-mentioned 'Centrex' file are given as parameters in the definition. The commands can also be used for adding and removing members of a group, adding and removing subnumbers of a group, adding and removing special numbers of a group, adding and removing names of exchanges, changing group data, removing a group, interrogation for group data, managing facilities of group members, etc. The command parameters of each command comprise relevant parameters from the different files which will not be described in more detail.

The establishment of a call in an exchange where a subscriber connected to the exchange is starting a call will be described. When the call control detects based on the subscriber data that the subscriber belongs to a closed user group, i.e., to a centrex user group, the call control uses data extracted from the data of the closed user group in the database to find out whether the subscriber is establishing the call using subnumbers of the user group or normal directory numbers. Then, the call control performs the necessary subnumber-to-directory number conversion, obtains the charging data needed for internal calls of the user group, and routes the call in accordance with the normal route selection analysis common to all calls. The number to be analyzed is thus the directory number corresponding to the subnumber of the user group. Alternatively, the call control routes an external call in accordance with the route selection analysis common to all calls. The number to be analyzed is then the directory number dialed by the subscriber without the out-line number used for the identification of external calls. From the exchange of the calling subscriber, the directory number of the calling subscriber is transferred by normal signaling to the exchange of the called subscriber. If the call control in the exchange of the called subscriber detects that the subscriber belongs to a closed user group, the call control verifies whether the directory number of the calling subscriber can be found in the subnumber/directory number table of the called subscriber.

Setting up an outgoing call by a member of a cetrex group will be described. Once the call control unit of an exchange has received information on the starting of a call, the call control requests the subscriber data by, using the location data of the subscriber. If the subscriber data indicates that the subscriber belongs to a centrex group, the call control unit requests that the basic switching service unit fetch the subscriber data from the centrex subscriber database, provided in the exchange in accordance with the invention. As a response to the request, the call control unit receives, for example, the following information: centrex group identifier, length of subnumbers used in the group, out-line number, operator number, and length of the abbreviated numbers common to the centrex group. This data, the call control finds out whether the call is from the operator or from a group member, and whether the called subscriber is a member of the same centrex group or not (the subscriber dials the outline number). In the case of an external call, the call establishment proceeds in a manner known to one skilled in the art. In the case of an internal call of a centrex group, the subnumber table of the calling subscriber's centrex group in the subscriber database of the invention (Table B in FIG. 3) is searched for the subnumber dialed by the subscriber, whereafter the subnumber is converted to the corresponding directory number of the telephone network. Other necessary data, is such as charging subgroup data and tariff data for internal calls, are also obtained from the database. Thereafter, the call establishment proceeds in the normal manner.

A member of a centrex group receives calls either with a direct number through the centrex operator or, in a centrex group with no operator, based on centrex hunting. In the case of an incoming call to a member of the centrex group, a subscriber with an analog connection is informed by various ringing tones of whether the call is from within or outside the centrex group. For this purpose, the call control must find out whether the calling subscriber belongs to the same group as the called subscriber. The comparison is made by the directory number of the calling subscriber, since the centrex group subscribers may be connected to different exchanges. If the directory number of the calling subscriber is not obtained, the call is interpreted as coming from outside the centrex group. When the call arrives at the exchange, the call control requests the data of the called subscriber in the normal manner from the basic switching service unit. If the called subscriber is found to be a member of the centrex group, it is verified at this stage at the latest whether the calling subscriber is also a member of the same centrex group. The centrex group index of the called subscriber is further verified from the database of the invention. If it is the same as that of the calling subscriber, the called subscriber is given a ringing tone which informs him that the incoming call is an 'internal call'.

The facilities described above in the case of an incoming and an outgoing call are intended merely to illustrate the invention. The following cases have not been discussed above: a call to the call number of the centrex group, a call to the personal number of the operator, redialling, the use of abbreviated numbers, the use of a digital connection, etc. The centrex database provided in the exchange can be utilized in the establishment of these calls, and the practical implementation is obvious to one skilled in the art.

Figure 4:
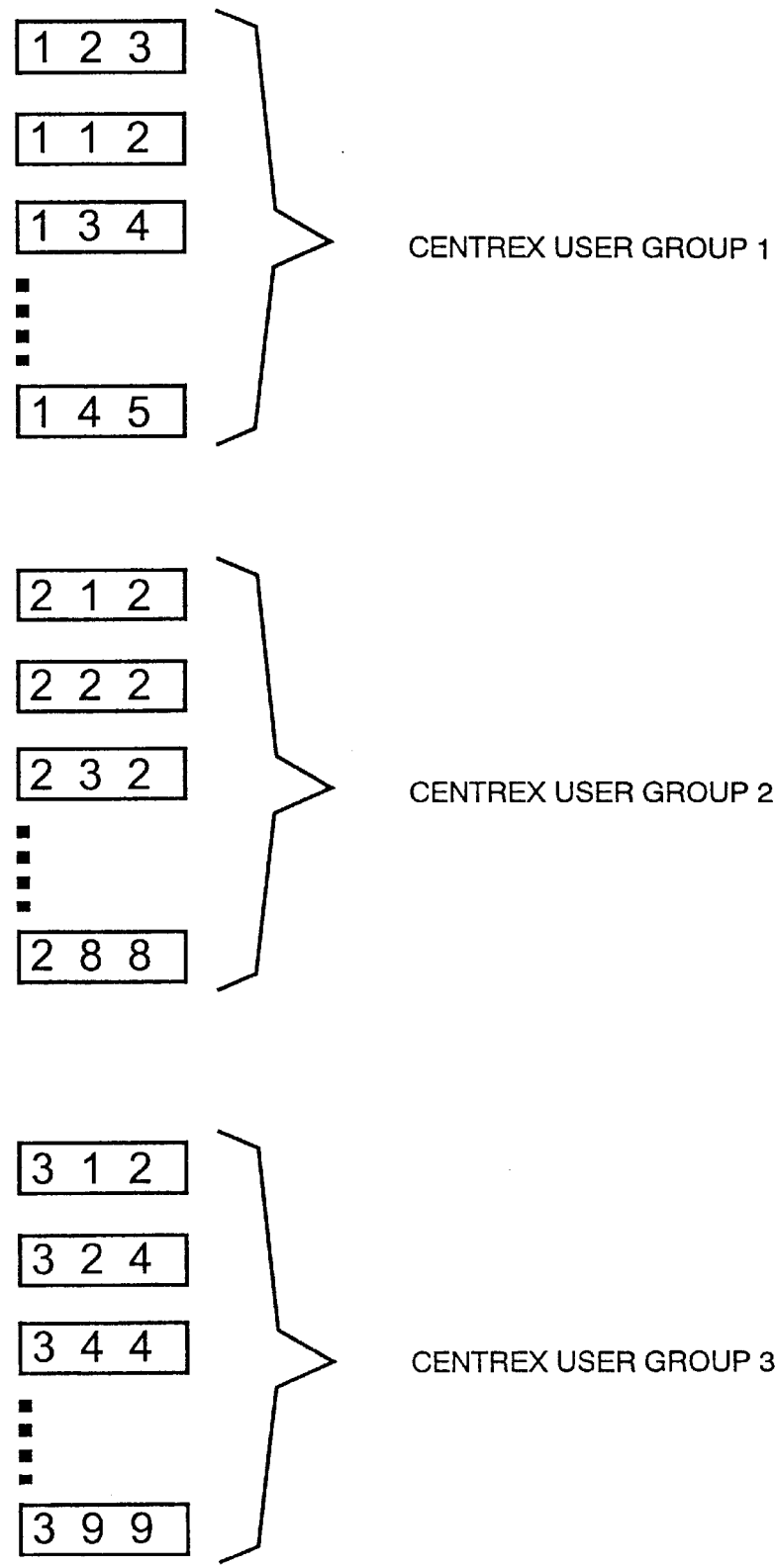
FIG. 4 illustrates the principle of subnumbering.

With reference to FIG. 4, let us examine in the following how the numbers of the subscriber databases can be utilized from the point of view of the operator. The number(s) reserved for identification of the user group (called reserved digits of a subnumber) is/are added to the subnumbers as the first number(s). FIG. 3 illustrates subnumbers of three centrex groups. All of these groups have the same operator. In the example, the subnumbers of the groups comprise three digits. As can be seen, the first digit in all subnumbers of group 1 is '1'; correspondingly, the first digit in all subnumbers of group 2 is '2'; and in the subnumbers of group 3, the first digit is '3'. These subnumbers are used when a call is made within the group. It should be noted that all these groups have the same operator number, e.g., 9, and the same out-line number, e.g., 0.

The procedure is as follows. When the call control detects based on the data of the operator that the operator is capable of selecting subnumbers of several user groups, the call control uses data extracted from the data of the closed user group in order to find out whether the operator is establishing the call using a subnumber of the user group or a normal directory number. After this, if the operator uses a subnumber, the call control collects dialing as long as needed for identifying the subnumber group used, i.e., the closed user group. In the example of FIG. 3, one digit is collected. When a sufficient number of dialed digits are received, the call control requests identification of the corresponding centrex group from the database. The response gives the index of the identified centrex group and other information. As a result of this, the subnumbers of the group can be accessed. The call control performs the necessary subnumber-to-directory number conversion using the subnumber/directory number table of the user group, which is provided in the subscriber database in the exchange in accordance with the invention. The same operator can thus serve several closed centrex groups.

It will be understood that the above description and the accompanying drawings are intended merely to illustrate the present invention. It will be obvious to those skilled in the art that the invention can be varied and modified without departing from the scope and spirit of the invention disclosed in the appended claims.

I claim:

1. A telephone network system offering centrex services, the telephone network system comprising:

a plurality of a telephone exchanges, a least one closed user group formed from subscribers connected to the exchanges so that one closed user group may be distributed as a subgroup to several different telephone exchanges, wherein a subscriber, within the closed user group, can call to a member of the same user group using a subnumber independent of an actual directory number, and the subscriber can make an external call from the closed user group by first dialing an out-line number; and a subscriber database, the subscriber database being stored in each exchange with subscribers of the closed user group, the subscriber database being associated with this user group and containing all necessary data for implementing centrex services, whereby the call control of the exchange, having detected, based on the subscriber data that the subscriber belongs to the closed user group, utilizes the subscriber database when establishing a call, the subscriber database being a table.

2. The system as claimed in claim 1, wherein the subscriber database comprises a centrex group data file, the centrex group data file comprising:

a name of the centrex group, the name being the same in all exchanges to which the centrex group is distributed, a call number of the group, and an area code of the call number, whereby an operator calls each group only by the name of the centrex group;

necessary charging data for calls within a subgroup and calls between subgroups;

information on the length of a subnumber;

the out-line number based on which the call control detects that the subscriber is trying to make an external call using a directory number; and the number of the operator.

3. The system as claimed in claim 1, wherein the subscriber database comprises a centrex group subnumber file, the centrex group subnumber file comprising:

a subnumber;

a directory number corresponding to the subnumber;

an area code of the directory number;

a number of a charging subgroup; and an index of the centrex group subnumber file.

4. The system as claimed in claim 1, wherein the subscriber database comprises a centrex exchange name file, the centrex exchange name file comprising names of the telephone exchanges to which the user group is distributed.

5. The system as claimed in claim 3, wherein the subnumbers of a user group begin with the same number sequence, and wherein different user groups have different number sequences, whereby the operator uses the number sequence to identify the user group.

6. A method for implementing centrex service in a telephone network system comprising a plurality of telephone exchanges, closed user groups being formed from subscribers connected to the exchanges so that at least one closed user group may be distributed as subgroups to several different telephone exchanges, whereby a subscriber can, within the closed user group, call to a member of the same group using a subnumber independent of a directory number, and the subscriber can make an external call from the closed user group by first dialing an out-line number, the method comprising:

a subscriber database stored in each exchange with subscribers of the closed user group, the subscriber database being associated with the user group and containing all necessary data for implementing centrex services, the subscriber database being a table; and in setting up a call where at least one of the subscribers is a member of a user group connected to the exchange, the call control uses the subscriber database of the user group to perform the necessary number conversions and to connect the call.

7. The method as claimed in claim 6, wherein, when the call control detects, based on the data of the calling subscriber that the subscriber belongs to a closed user group, the call control fetches from the subscriber database of the group, the identification data which indicates whether the subscriber is establishing the call using a subnumber or using a directory number as the called number.

8. The method as claimed in claim 7, wherein, when the identification data indicates that the subscriber is using a subnumber, the call control fetches from the subscriber database the directory number corresponding to the subnumber and the charging data needed for internal calls, and thereafter routes the call in accordance with the normal route selection analysis common to all calls.

9. The method as claimed in claim 7, wherein, when the identification data indicates that the subscriber is using the directory number, the call control routes the call in accordance with the normal route selection analysis common to all calls.

10. The method as claimed in claim 6, wherein, from the exchange of the calling subscriber, the directory number of the calling subscriber is transferred by normal signaling to the exchange of the called subscriber, where the call control performs a facility analysis; and if the analysis shows that the called subscriber belongs to a closed user group, the call control verifies from the subscriber database of the user group of the called subscriber whether it contains the directory number of the calling subscriber, whereby the call control indicates to the calling subscriber with a certain ringing tone that the call is a centrex call.

11. The method as claimed in claim 6, wherein, in the subscriber database, all subnumbers of a user group begin with the same number sequence, and different user groups have number sequences, which are different but of the same length, whereby the operator uses the sequence to identify the user group.

12. The method as claimed in claim 11, wherein, when the call control detects that the operator is capable of selecting subnumbers of several user groups, the call control fetches from the database of the closed user group the identification data which indicates whether the operator is establishing the call using subnumbers or normal directory numbers.

13. The method as claimed in claim 12, wherein the call control, after having obtained the identification data, collects dialed digits until the call control has received the number of digits reserved for a subnumber of a closed user group;

finds out which closed user group the operator is using; and fetches the directory number corresponding to the subnumber from the subscriber database.

14. The system as claimed in claim 2, wherein the subscriber database comprises a centrex group subnumber file, the centrex group subnumber file comprising:

a subnumber;

a directory number corresponding to the subnumber;

an area code of the directory number;

a number of a charging subgroup; and an index of the centrex group subscriber file.

15. The system as claimed in claim 14, wherein the subnumbers of a user group begin with the same number sequence, and wherein different user groups have different number sequences, whereby the operator uses the number sequence to identify the user group.

* * * * *